United States Patent [19]

Gallimore

[11] Patent Number: 4,882,769

[45] Date of Patent: Nov. 21, 1989

[54] AM/FM RADIO WITH SUNGLASS HOUSING

[76] Inventor: Bruce A. Gallimore, 526 Marborough, Detroit, Mich. 48215

[21] Appl. No.: 214,936

[22] Filed: Jul. 5, 1988

[51] Int. Cl.⁴ .............................................. H04B 1/08
[52] U.S. Cl. .................................... 455/344; 455/347; 455/351
[58] Field of Search ............... 455/350, 349, 344, 351, 455/347, 348; 351/158, 41; D16/102, 103

[56] References Cited

FOREIGN PATENT DOCUMENTS

| 0162194 | 11/1985 | European Pat. Off. | 455/351 |
| 0113912 | 7/1983 | Japan | 351/158 |
| 0161928 | 9/1984 | Japan | 455/351 |

OTHER PUBLICATIONS

Taiwa Okanabu, *A Complete Single Chip AM/FM Radio Integrated Circuit*, Aug. 1982, pp. 393–408.

Primary Examiner—Benedict V. Safourek
Assistant Examiner—Curtis Kuntz
Attorney, Agent, or Firm—Dykema Gossett

[57] ABSTRACT

In an AM/FM radio, a housing in the form of sunglasses including a pair of temples, the housing including a hollow top frame and a bottom frame supporting a pair of tinted lenses. An AM/FM radio with its electrical components is mounted within the top frame and includes an electrical output lead connected to a pair of jacks. A pair of electronic speakers are slidably mounted upon the temples adapted for registry with the user's ears, each speaker having a flexible lead interconnecting a speaker with one of the jacks.

4 Claims, 1 Drawing Sheet

AM/FM RADIO WITH SUNGLASS HOUSING

FIELD OF INVENTION

The present invention relates to an AM/FM radio and more particularly to such radio as supported and mounted within a pair of sunglasses.

BACKGROUND OF THE INVENTION

Music has had an almost universal appeal among all cultures. Western music has grown and been refined. Jazz was long considered as questionable among the more "respectable," but is currently enjoying greater popularity. Currently, classical music is being promoted. Rock music is related to jazz with both originating from the blues. One medium many people use to listen to the music they love is the radio. Radio stations abound in the United States on both AM and FM frequencies for which there have been developed various types of AM/FM stereo radios.

The problem relates to the need of a means to be able to listen to AM/FM stereo receiver even when engaged in sporting events that might otherwise normally prevent one from conveniently using the conventional receiver due to the wire connecting the earphones to the unit.

THE PRIOR ART

Headsets and headphones for electronic devices generally are shown in one or more of the following United States and foreign patents:

|  | PATENT NO. | INVENTOR | DATE |
|---|---|---|---|
|  | 3,984,645 | Kresch | 10/5/76 |
|  | 4,020,297 | Brodie | 4/26/77 |
|  | 4,374,301 | Freider | 2/15/83 |
| Canada | 602,063 | Liddell, et al. | 7/19/60 |
| Japan | 59-223096 | Seiko Denshi Kogyo | 1984 |
| W. Germany | DE 3509658-A1 | Eberhardt | 9/18/86 |

SUMMARY OF THE INVENTION

An important feature of the present invention is to incorporate an AM/FM stereo radio into a housing in the form of sunglasses so that during and at the attendance of various sporting events, though not limited to such events, the AM/FM radio may be selectively operated and used with the earpieces therefor in the form of right and left-hand speakers adjustably mounted upon the temples for the sunglasses.

An important feature of the present invention is to therefore provide in an AM/FM radio a housing in the form of sunglasses which includes a pair of temples and wherein the housing includes a hollow top frame and a bottom frame supporting therebetween a pair of tinted lenses. A radio with its electrical component is mounted within the top frame and includes an electrical output lead connected to a pair of jacks. A pair of electronic speakers are slidably mounted upon the temples adapted for registry with the user's ears with each speaker having a flexible lead interconnecting a speaker with one of the jacks.

As another feature, the top frame includes a battery compartment for storing an electrical power source connected to the radio together with a removable panel forming a part of the top frame normally closing such compartment.

As another feature, there is provided an ON/OFF switch connected to the radio and having a movable control which slidably projects through a slot in the top frame for manual access thereto.

As another feature, an AM/FM switch is connected to the radio and includes a slide selector projecting through a slot in the top frame for manually altering the mode of operation of the radio.

As another feature, an electrical tuner including a variable capacitor is connected to the radio and has a rotative control which projects through a slot in the top frame for access thereto.

As another feature, a stereo control switch is connected to the radio output lead and includes a movable control arm extending through a slot in the top frame.

As a still further feature, a volume control switch is provided including a variable potentiometer connected to said radio output lead and including a control arm projected through a slot in the top frame for access thereto.

It is a further feature to provided an AM/FM radio housed within a pair of eyeglasses as a frame therefor, useful to individuals who enjoy activities such as tennis, racket ball, ice skating, snowmobiling and a variety of other sports which normally prevent one from using a conventional stereo receiver.

By combining the stereo radio with the sunglasses, there is provided a further functional use for the present device which most people need when listening to music out in the direct sunlight.

These and other features and objects will be seen from the following specification and claims in conjunction with the appended drawing.

THE DRAWING

It will be understood that the above drawing illustrates merely a preferred embodiment of the invention and that other embodiments are contemplated within the scope of the claims hereafter set forth.

DETAILED DESCRIPTION OF AN EMBODIMENT OF THE INVENTION

Figure 1:
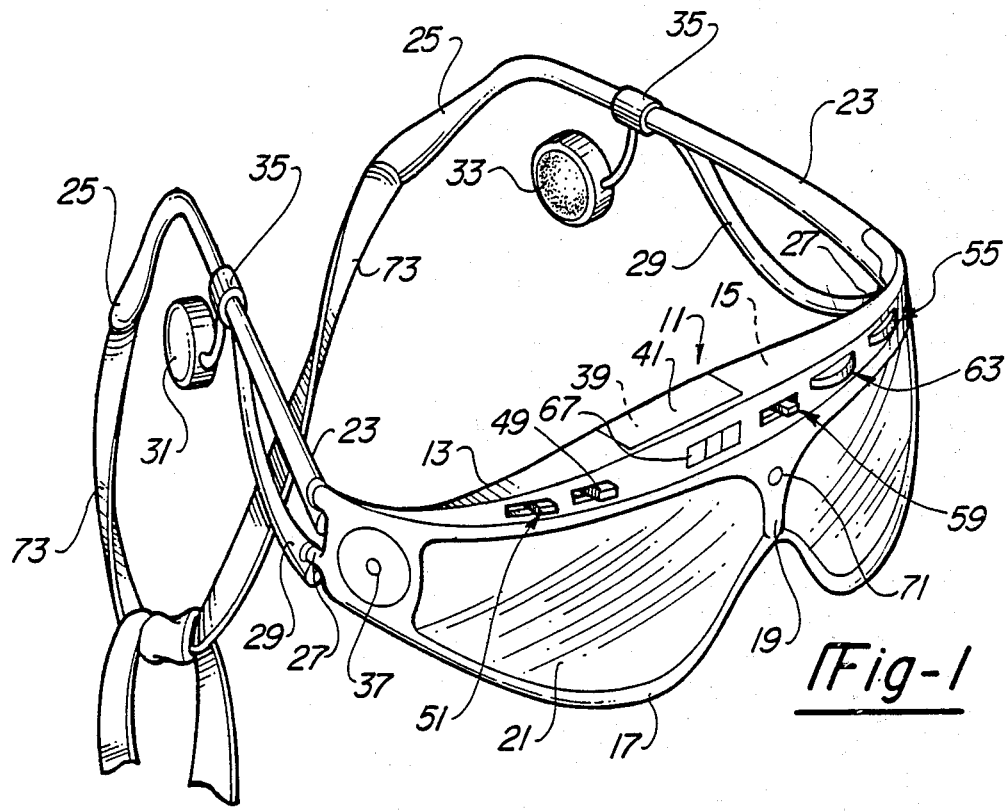
FIG. 1 is a front perspective view of the present AM/FM radio with eyeglass housing.
Figure 2:
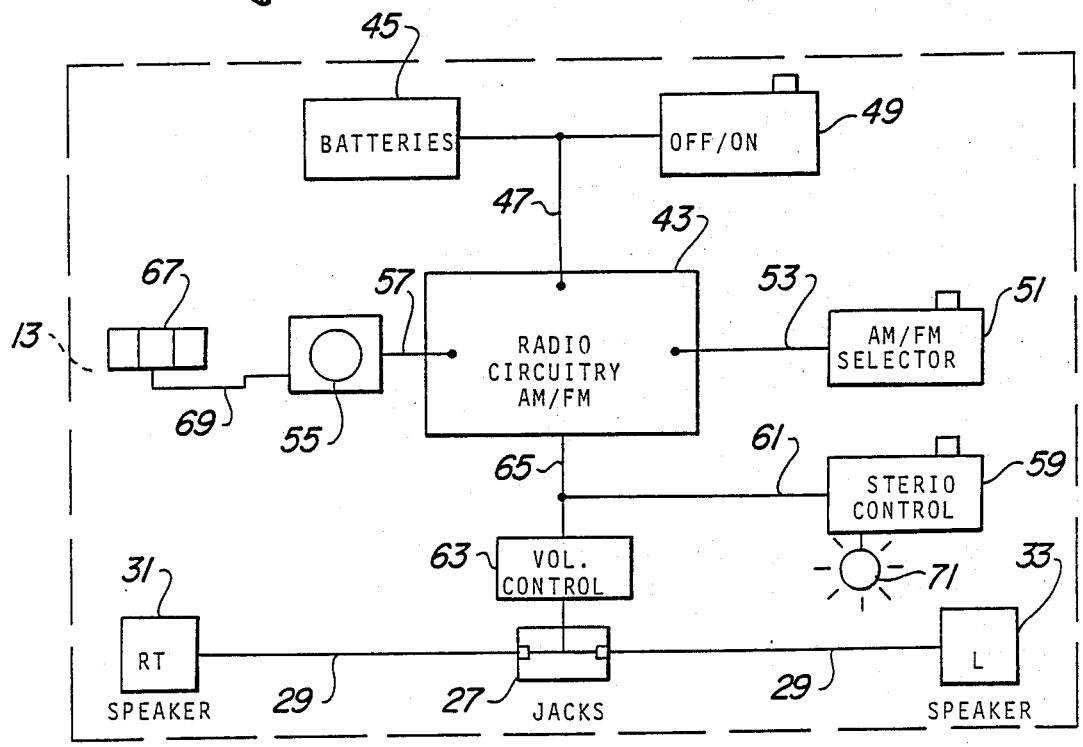
FIG. 2 is a schematic block diagram of the electrical components therefor.

Referring to the drawing, the present AM/FM radio with sunglass housing is generally indicated at 11, FIG. 1, and includes a top hollow frame 13 of a suitable plastic material and defining a chamber 15 within which the components for the AM/FM radio are located such as shown in detail in FIG. 2. The housing further includes a bottom frame 17 and a center upright divider 19 therebetween. A pair of tinted arcuate lens 21, preferably constructed of plexiglass or other plastic material, are retainingly nested within corresponding grooves within the top and bottom frames as in conventional constructions.

The present sunglass frame includes a pair of rearwardly extending temples 23 at their forward ends pivoted to the housing in a conventional manner and at their other ends terminating in a pair of downturned earpieces 25.

A pair of female jacks 27 are mounted adjacent the positive ends of the top frame 13 and are adapted to receive the one ends of the covered lead wires 29 whose opposite ends are connected to the respective right and left speakers 31 and 33. Each of the speakers is slidably suspended upon the temples 23 by apertured brackets 35, a portion of which depends therefrom and is connected to the corresponding speaker and through which a portion of the lead wire 29 extends, establishing electrical connection between the respective speakers 31 and 33 and the corresponding jacks 27.

Mounted upon the exterior of the housing 11 adjacent its opposite ends are a pair of outwardly opening secondary earplug jacks 37 which are adapted to receive corresponding electrical leads from a pair of speakers other than the speakers shown in the drawing which may be suspended from the user's head over the ears at a time when the radio itself is not mounted upon the head but might otherwise stored within the pocket of a user or upon his belt. This would provide a secondary means by which the output from the radio could be delivered through the secondary jacks 37 to a secondary pair of speakers for independent mounting upon the user's head adjacent the respective ears.

Shown in the drawing, FIG. 1, centrally of the top frame 13, is a battery compartment 39 adapted to store three or four triple A batteries as an electrical power source normally retained in position and enclosed by the removable panel 41 forming a part of said top frame and smoothly blending therewith.

The AM/FM radio 43 shown in the schematic diagram, FIG. 2, is positioned within the top frame 13, as indicated in dashed lines in FIG. 2, and includes a conventional circuitry including the lead 47 from the batteries 45 stored within battery compartment 39, FIG. 1.

The ON/OFF switch 49 shown in the diagram, FIG. 2, is connected to lead 47 for controlling electrical power to the radio 43. Corresponding ON/OFF switch 49 is further shown in FIG. 1 as including a movable element which extends through a corresponding slot within top frame 13, FIG. 1.

The AM/FM slide selector switch 51 in the diagram, FIG. 2, is connected by lead 53 to the radio circuit at 43. Said selector 51 is further shown as having a movable element which extends through a corresponding slot in top frame 13. The AM/FM slide selector switch 51 is connected to the radio circuit by the lead 53.

As shown in FIG. 2, a conventional tuner 55 having a variable capacitor, whether linear or rotating, is connected by lead 57 to the radio 43. Said tuner 55 is designated in FIG. 1 as having a rotatable member which partly projects outwardly through a corresponding slot in top frame 13. A stereo control 59, schematically shown in FIG. 2, through lead 61 is connected to the output lead 65 of radio 43. The stereo control 59 is further shown essentially at FIG. 1 as including a movable element which projects through a corresponding slot in the top frame 13. Connected to the radio output lead 65 is volume control switch 63 which includes a rotary or linear potentiometer as a conventional construction permanently nested within the chamber 15 of the top frame 13 as a part of the radio circuitry, FIG. 2. This movable member projects through a corresponding slot within top frame 13 for access thereto.

The corresponding lead 65 extending from the volume control 63 is joined to the respective jacks 27, FIG. 2, and also shown at the respective ends of the housing 13, FIG. 1, adapted for connection to the respective leads 29 which lead to the right and left speakers 31 and 33.

The respective brackets 35 which support the corresponding speakers 31 and 33 are looped over the respective temples 23 and are slidably adjustable thereon so that the corresponding right and left speakers 31 and 33 are in opposing registry with the user's ears.

The speakers 31 and 33, about ¾ inch in diameter for illustration, are similar to those used by many portable stereo manufacturers. From viewing FIG. 1, it appears that the AM/FM radio or equivalent radio is turned on or off by the manual switch 49 which automatically connects the power source 45, namely the batteries, through lead 47 to the conventional circuit of the radio shown at 43, FIG. 2.

For the operation of the radio, manual tuner 55 partly projects from top frame 13, FIG. 1, so as to provide manual access thereto. The AM/FM control switch 51 extends through a corresponding slot within the top frame 13 providing access to the interior thereof for determining the mode of operation of the radio as AM or FM selectively.

The stereo control includes an arm designated at 59, FIG. 1, which extends through a corresponding slot in the top frame 13 for controlling stereo operation of the radio. The conventional volume control 63 includes manual element designated at 63 in FIG. 1 which projects through a corresponding slot in the front face of the top frame 13 for access thereto.

It is noted that the respective above-described openings or slots within the top frame 13 are substantially coplanar to provide convenient manual access to the respective switches or elements for control of the radio shown in detail in FIG. 2.

A plastic is employed for the housing including top frame and bottom frame 17 such as polyvinyl chloride for its toughness and strength.

Digital readout 67 is connected to tuner 55, FIG. 2, by lead 69, and is located upon the front face of top frame 13, FIG. 1. Readout 67 provides a visible designation of the station selected.

Stereo control 59 has a light 71 connected thereto, FIG. 2, located within top frame 13, centrally thereof, FIG. 1. Said light when aluminated indicates that the stereo control is turned on, for stereo listening at speakers 31, 32.

The flexible ties 73, FIG. 1, at their one ends depend from ear pieces 25, and when tied together provides a means of suspending the radio from the neck, when not otherwise in use and to give the users nose a rest.

The respective electrical components for the radio are available on the market and are schematically disclosed in FIG. 2 of the drawing.

In the illustrative embodiment, the lenses are preferably arcuate, tinted and constructed of a Lucite or plexiglass material which is a tough, hard, transparent thermoplastic with good optical clarity.

The present radio can be used with the sunglasses worn whenever and wherever the wearing of sunglasses is considered appropriate attire.

It is contemplated for attractiveness that the housing may be of different colors or otherwise ornamented.

Having thus described my invention, reference should now be had to the following claims.

I claim:

1. In combination, a housing in the form of sunglasses including a pair of rearwardly extending pivoted temples, the housing including a hollow top frame and a bottom frame;
   an AM/FM radio with its electrical components mounted and enclosed within said top frame and including an output lead;

a pair of spaced jacks adjacent the ends of said housing and connected to said lead respectively;

right and left electric speakers slidably mounted upon said temples respectively, adapted for registry with the user's ears;

a flexible electrical lead interconnecting each speaker with one of said jacks;

said top frame including a battery compartment for storing an electrical power source connected to said radio;

a removable panel forming a part of said top frame normally closing said compartment;

an ON/OFF switch connected to said radio and having a movable control slidably projected through a slot in said top frame for manual access thereto;

an AM/FM switch connected to said radio and including a slidable selector projecting through a slot in said top frame;

an electrical tuner including a variable capacitor connected to said radio and having a rotative control projected through a slot in said top frame;

an stereo control switch connected to said radio output lead and including a movable control arm extending through a slot in said top frame;

a volume control switch including a variable potentiometer connected to said radio output lead and including a control arm projected through a slot in said top frame;

all of said slots being in longitudinal alignment along the length and upon the front of said top frame.

2. In the combination claim 1, a pair of secondary ear plug jacks mounted upon said housing adjacent its ends and connected to said radio output lead;

said secondary jacks adapted to receive the connectors from a pair of speakers suspended adjacent the user's ears.

3. In the combination claim 1, the mounting of each speaker upon a temple including an apertured bracket connected to said speakers slidably mounted upon one of said temples.

4. In the combination claim 3, said flexible electrical leads extending from said speakers and through said brackets.

* * * * *